United States Patent
Ebstein

(10) Patent No.: US 6,180,946 B1
(45) Date of Patent: Jan. 30, 2001

(54) RADIATION CAMERA WITH HIGH SPATIAL, TEMPORAL, AND ENERGY RESOLUTION

(75) Inventor: Steven M. Ebstein, Newton, MA (US)

(73) Assignee: Lexitek, Inc., Wellesley, MA (US)

(*) Notice: Under 35 U.S.C. 154(b), the term of this patent shall be extended for 0 days.

(21) Appl. No.: 09/061,455

(22) Filed: Apr. 16, 1998

Related U.S. Application Data

(60) Provisional application No. 60/044,070, filed on Apr. 17, 1997.

(51) Int. Cl.[7] ........................................ G01T 1/20
(52) U.S. Cl. ............................. 250/370.11; 250/390.11
(58) Field of Search ..................... 250/370.11, 363.06, 250/390.01, 390.11, 369, 367, 370.1, 390.12

(56) References Cited

U.S. PATENT DOCUMENTS 5,783,829 * 7/1998 Sealock et al. ..................... 250/367

OTHER PUBLICATIONS

C. Papaliolios et al, "Speckle Imaging with PAPA Detector", App. Opt. 24, 285 p. 287, Jan. 1985.*

Anger, Hal. O., "Scintillation Camera", Donner Laboratory of Biophysics and Medical Physics and Radiation Laboratory, University of California, Berkeley, California, The Review of Scientific Instruments, vol. 29, No. 1, Jan. 1958, pp. 27–33.

* cited by examiner

Primary Examiner—Seungsook Ham
Assistant Examiner—Richard Hanig
(74) Attorney, Agent, or Firm—Bromberg & Sunstein LLP

(57) ABSTRACT

An imaging ionizing radiation detector with a high pixel resolution is described. The detector comprises a scintillating crystal and associated sensors which determine the energy and position of the scintillation with high spatial, temporal, and energy resolution. The position sensing is done with a photon counting and position sensitive detector. The detector can achieve sub-millimeter resolution and the position determination is performed at MHZ rates.

24 Claims, 2 Drawing Sheets

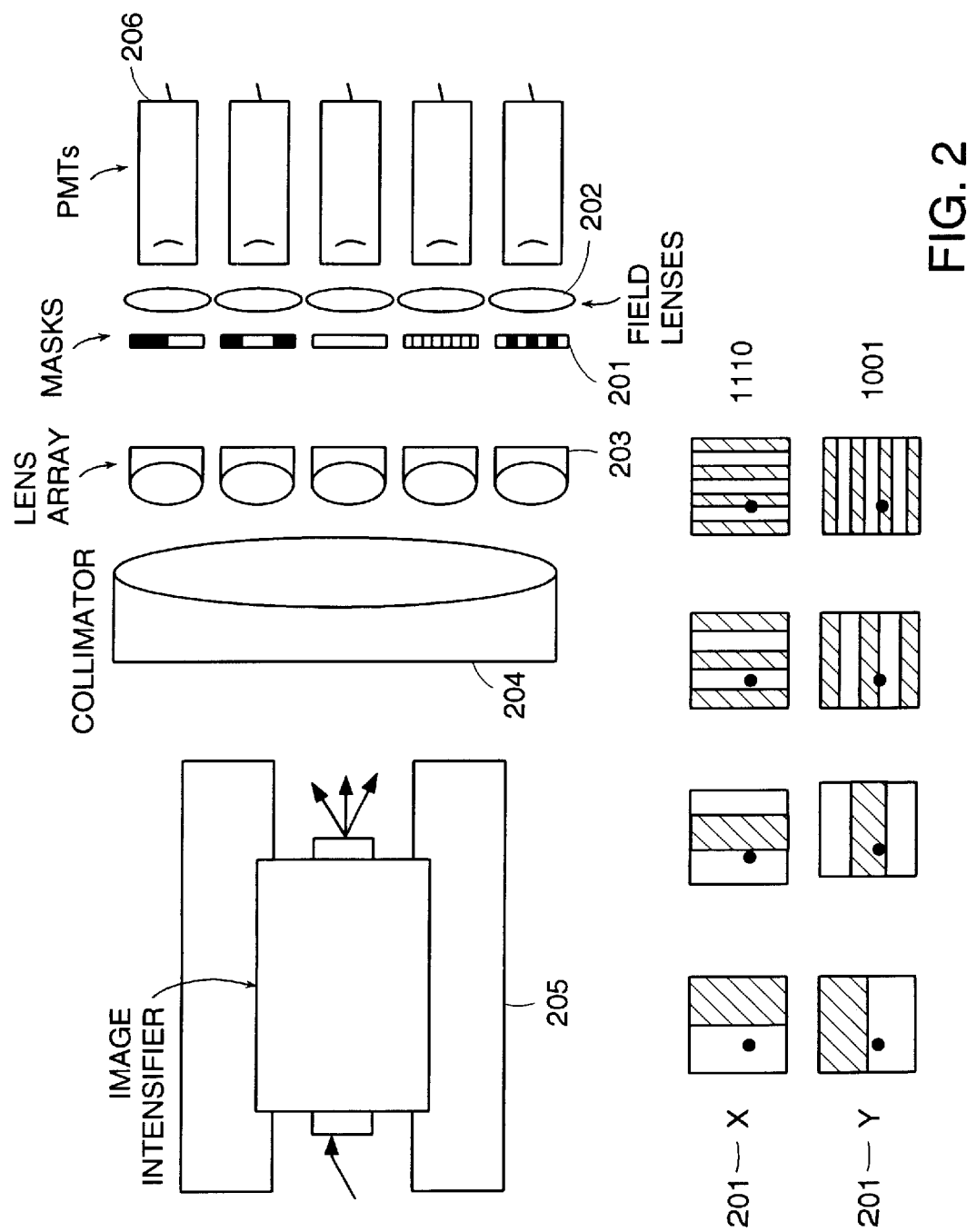

RADIATION CAMERA WITH HIGH SPATIAL, TEMPORAL, AND ENERGY RESOLUTION

This application claims priority from provisional application Ser. No. 60/044,070, filed Apr. 17, 1997, entitled "Gamma Camera with High Resolution Spatial, Temporal, and Energy Resolution" which is incorporated herein, in its entirety, by reference.

TECHNICAL FIELD

The present invention relates to energetic particle imaging and, more specifically, to radiation imaging cameras.

BACKGROUND ART

There are various types of radiation imaging cameras available including gamma ray cameras and neutron cameras. Two types of imaging gamma detectors are in wide use. Gamma cameras used for nuclear medicine are descendants of the Anger camera and consist of a scintillating crystal viewed by an array of photo multipliers (PMTs). See Anger H O. "Scintillation Camera," Rev Sci. Instr. 1958; 29: 27, which is hereby incorporated by reference herein. When an incident energetic penetrating particle is absorbed by a crystal, it produces a scintillation event. The total measured scintillation is used to determine the radiation energy. Its position is determined by centroiding the location on the array of PMTs. The intrinsic spatial resolution is limited by the size of the PMTs and the Poisson statistics of the scintillation. These detectors typically have intrinsic resolution of several mm with arrays of 50–100 PMTs.

A second type of gamma detector consists of an array of photosensitive crystals such as ZnCdTe. These detectors have better energy resolution than the Anger camera since their photo detection efficiency is much greater than the product of the scintillation efficiency and the subsequent PMT quantum efficiency. However, it is currently very expensive to fabricate an array with many pixels. These detectors have found application in coded aperture gamma-ray astronomy detectors with up to thousands of discrete pixels.

Another type of ionizing radiation camera is designed to locate neutrons. Two-dimensional position sensitive neutron detectors are currently limited in either their spatial or temporal resolution. Scintillator-based detectors similar to the Anger camera have only modest spatial resolution as do He$^3$ thermal neutron detectors. As compared to the scintillator and He$^3$ detectors, CCD-based detectors have good spatial resolution, however they are not counting detectors and therefore have poor temporal resolution. Additionally, CCD-based detectors lack the ability to discriminate gamma rays from neutrons. This limits neutron imaging of special nuclear material and use of neutron scattering for diagnostic purposes and nondestructive testing.

SUMMARY OF THE INVENTION

The present invention introduces a new class of imaging radiation detectors. In a preferred embodiment, an ionizing radiation camera uses a scintillator to convert invisible radiation to visible radiation and photo multipliers(PMTs) to determine the energy of the radiation. The scintillation is spatially resolved by imaging it onto a photon counting and position sensitive detector, which may be implemented with a precision analog photon address (PAPA) detector. In one embodiment of the invention, the PAPA detector determines the scintillation position on a 1024×1024 pixel grid in ~100 ns.

In an embodiment, the ionizing radiation camera comprises a scintillator for emitting photons in response to radiation incident upon the scintillator, and a photon counting and position sensitive detector in optical communication with the scintillator for providing the position of the radiation. The scintillator emits a first group of photons, indicative of the position of the radiation, along a first path in the direction of the photon counting and position sensitive detector, so that the photon counting and position sensitive detector is responsive to this first group of photons and provides position information of the radiation. The scintillator emits a second group of photons in response to the radiation along a second path. One or more photo detectors are responsive to this second group of photons so as to determine a characteristic of the radiation, such as the type of radiation or the energy level.

In another embodiment, an optical lens is positioned to receive emitted photons from the scintillator for directing the emitted photons onto the photon counting and position sensitive detector.

In yet another embodiment of the invention, the scintillator, has an internally mirrored front radiation entrance and a side for allowing some of the emitted photons to exit.

In a further embodiment of the invention, the scintillator, is square and has an internally mirrored radiation entrance and a clear exit window. Two of the four sides are mirrored while the other two sides are clear and allow some of the emitted photons to exit.

In yet another embodiment, the photon counting and position sensitive detector is a PAPA detector. An optional imaging plate may be positioned such that the radiation is guided through n aperture in the imaging plate and directed toward the scintillator.

BRIEF DESCRIPTION OF THE DRAWINGS

The foregoing features of the invention will be more readily understood by reference to the following detailed description taken with the accompanying drawings:

FIG. 2 is a schematic view of the photon counting and position sensitive detector and the Gray code masks.

DETAILED DESCRIPTION OF SPECIFIC EMBODIMENTS

Figure 1:
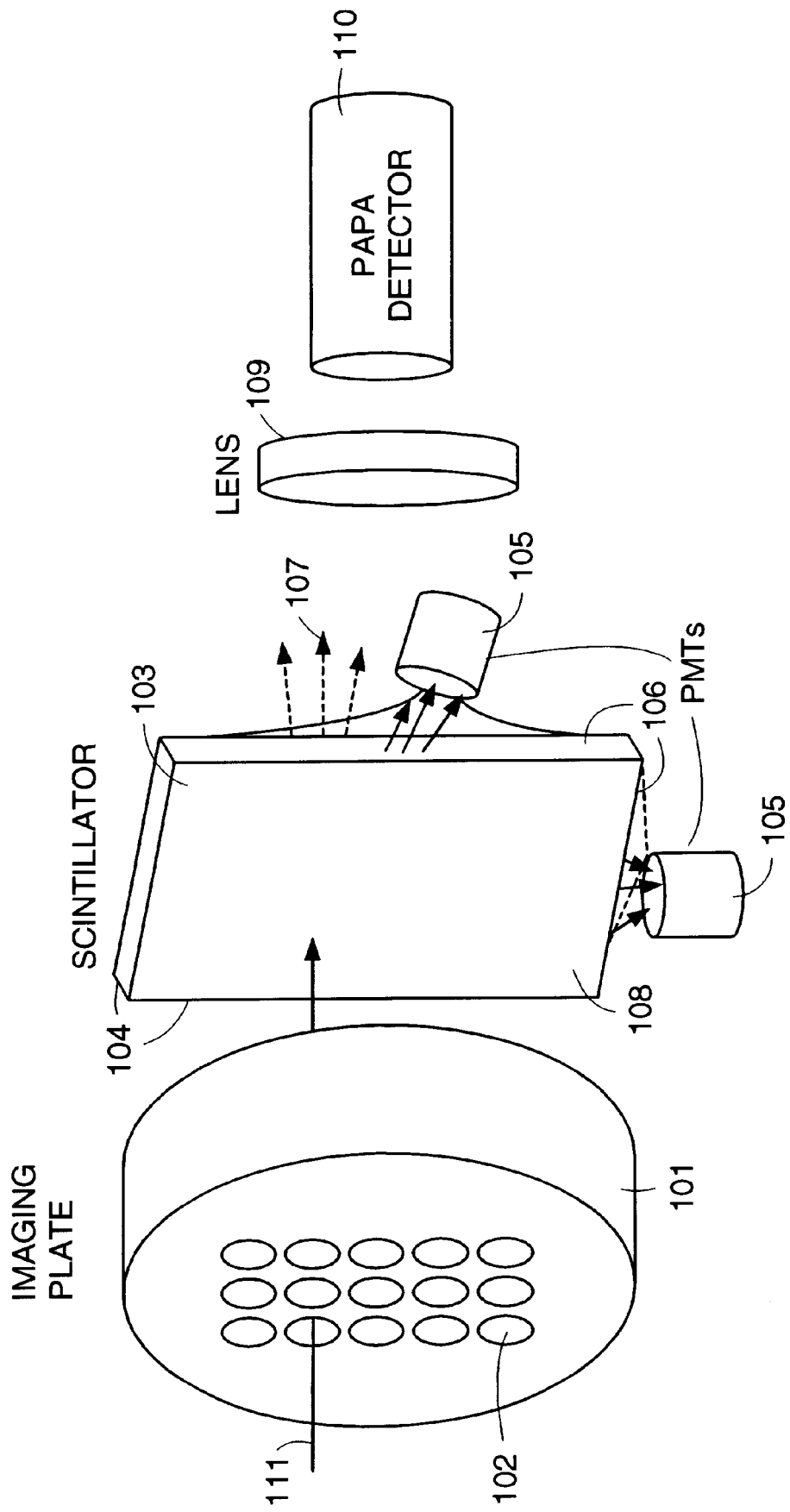
FIG. 1 is a schematic view of the preferred embodiment of the radiation detector.

A detector in accordance with a preferred embodiment of the present invention includes the following subsections: scintillator, energy measurement subsystem, position measurement subsystem, and data acquisition.

The detector may be used for detecting a variety of ionizing radiation, such as, but not limited to, gamma rays and neutrons. Radiation in this specification and the attached claims, refers to ionizing radiation and includes massless particles such as photons and neutrinos as well as particles with non-zero rest mass.

The latter include elementary particles, atoms, and molecules, causing ionization which results in scintillation both when the particles are charged or neutral. Examples of which include electrons, positrons, protons, neutrons, and mesons, atomic and molecular ions, and neutral atoms and molecules. The term, characteristic of radiation, in the following specification and attached claims may refer to the energy level of radiation, the type of radiation, the intensity level of the radiation, the pulse shape of the radiation or the pulse height of the radiation. The term characteristic of radiation is in no way limited to the foregoing.

There are many practical applications for the ionizing radiation camera. For example, if the detector is used for neutron scattering it's uses might include nondestructive testing of low-Z materials and process control of material fabrication. Research applications might include neutron radiography, nondestructive testing, and material analysis. If the detector is a gamma detector, some of, but not all of its uses might include, nuclear medicine imaging, astrophysics imaging, and imaging radio active material in nuclear weapons.

After outlining the composition and function of each component in the preferred embodiment, a brief description of the operation of the preferred embodiment of the ionizing radiation camera is given and then each component is discussed in some detail in its own subsection.

The scintillating crystal 103, as represented in FIG. 1, converts incident radiation 111 to visible light 107. Its properties determine what fraction of incident radiation 111 is detected, how bright a scintillation event is produced, and over what time period. Its thickness and stopping power determine the distribution of scintillation events. In one embodiment of a gamma ray camera, the scintillation crystal 103 may be formed from one of the following, sodium iodide doped with thallium NaI (Tl), cerium doped lutetium oxyorthosilicate (LSO), BGO, or CsI (Na), but is not limited to the aforementioned. In another embodiment, if the camera is used for fast neutron detection the scintillation crystal 103 may be formed from ZnS (Ag) phosphor embedded in hydrogenous plastic, but is not limited to this choice. In yet another embodiment, if the camera is used for thermal neutron detection a matrix of lithium compound dispersed in a fine ZnS (Ag) powder may be used for the scintillation crystal 103. Alternative crystals are available with less light output. In another embodiment for charged particle detection, a phosphor screen with P47 may be used to convert the particles' energy to visible light. Alternative phosphors with different light conversion efficiencies and decay times are available.

The energy measurement subsystem in accordance with one embodiment, comprises PMTs 105, which receive light from the scintillation crystal 103, and electronics (not shown) which drive the PMTs 105 and process the scintillation pulses.

The position measurement subsystem in accordance with one embodiment comprises optics 109 which couple light, coming out the face of the scintillator 103, and the photon counting and position sensitive detector 110 onto which that light is imaged.

Operation of the Radiation Detector

In the preferred embodiment, the hybrid detector of FIG. 1 operates as follows. An imaging plate 101, either a collimator or a coded aperture, images radiation which passes through the clear apertures 102 of the plate onto a thin scintillator plate 103 with rectangular sides. Each incident radiation 111 causes a scintillation pulse of light 107 that is isotropically emitted within several hundred nanoseconds. A small portion of the scintillation light is emitted out the face of the crystal furthest from the radiation source. This emitted light, indicated by arrows, 107 is referred to as the forward radiated light. The scintillation radiated back toward the source is also directed out that face by a reflective coating 108 on the face closest to the radiation source. Light 107 from this face travels over a first path which includes a lens 109 and a photon counting and position sensitive detector 110. The lens 109 images the forward radiated light onto the photon counting and position sensitive detector 110 which determines the spatial location of each scintillation pulse. The majority of the scintillation is totally internally reflected off the faces of the plate and directed out the sides of the plate. The simplest arrangement, shown in FIG. 1, has reflective coatings on two of the sides 104 so this light is directed over a second path from the sides 104 to two PMTs\photodetectors 105 on the other two sides 106. Signals from these PMTs 105 determine the radiation energy.

Scintillator

In the preferred embodiment, the scintillator 103 is a rectangular flat-plate scintillator. The front (radiation entrance) surface 108 has a mirror bonded to it to direct light, that would otherwise go toward the source, toward the PAPA detector 110. The preferred embodiment calls for at least two PMTs 105 positioned at two orthogonal sides 106 of the scintillation crystal, possibly with mirrors on the sides opposite them 104.

Energy Subsystem

In one embodiment, the design of the energy subsystem involves the number and physical configuration of PMTs 105 (FIG. 1) viewing the side-directed light/emitted photons 107 from the scintillator 103, the light coupling from the scintillator crystal 103 to the PMTs 105, and the pulse electronics (not shown) which amplify the scintillation pulse and quantify its height. In an embodiment, the PMTs 105 detect whether a gamma ray or a neutron produced the scintillation by pulse height discrimination or pulse shape discrimination. See S. Ebstein, C. Ku "Nuclear Physics Instrumentation and Techniques: Detector Materials and Targets," DOE proposal, which is hereby incorporated by reference in its entirety. Other types of radiation may also be determined through pulse height and pulse shape discrimination.

The choice of PMTs 105 is governed by their quantum efficiency, gain, price, and convenience of use. In a preferred embodiment, a high quantum efficiency PMT, the Phillips XP2050, may be used. In one embodiment, two PMTs 105 are used on adjacent sides 106 of the scintillator and mirrors are mounted onto the two opposing sides 104 of the scintillator.

In an embodiment, the pulse processing electronics (not shown) are nuclear instrumentation modules (NIM). A NIM crate, a NIM pulse amplifier, and a NIM high voltage supply are used. Also, used are a PMT base, a preamplifier, and a NIM A/D converter. One choice for the pulse amplifier is a Canberra model 2024 with adjustable pulse shaping time. An A/D converter which may be used is a Canberra model 8715.

Scintillating plates 103 have been used for years to detect high energy radiation. A plate 103 sufficiently thick to stop the radiation of interest is fabricated from a scintillating material. The scintillator's high index of refraction relative to air causes the majority of the light to be directed out the sides of the scintillator via total internal reflections off the faces of the plate. This light is directed to PMTs 105 which measures the light pulse. Off-the-shelf scintillators, PMTs, and readout electronics are widely available for this task.

Position Subsystem

The position of scintillation events, in accordance with one embodiment, is determined by imaging the scintillating crystal 103 onto a photon counting and position sensitive detector 110, preferably a PAPA detector. As the crystal 103 is typically larger than the photosensitive area of the detector, lens 109 coupling demagnifies the scintillator 103 onto the PAPA detector 110. The fraction of the scintillation photons which are detected, on average, by the PAPA detector 110 depends on the refractive index of the scintillator 103, the f/# of the coupling lens 109, the demagnification at which it operates, and the quantum efficiency of the image intensifier at the front-end of the PAPA detector 110.

The PAPA detector 110 is a novel photon-counting imaging detector that was originally developed for visible high-angular-resolution ground-based astronomical imaging. See C. Papaliolios, P. Nisenson, and S. Ebstein, "Speckle Imaging with the PAPA Detector," *Appl. Opt.* 24, 285 (1985), which is hereby incorporated by reference herein. A PAPA detector 110 is radically different from other photon-counting detectors because it separates the photo detection and gain functions from the photon position measurement. The PAPA detector 110 generates an amplified light pulse using an image intensifier 205 which in turn uses a microchannel plate (MCP) with a fast phosphor. In the preferred embodiment, a chevron-MCP intensifier with a bialkali photocathode and a P47 phosphor can be used. Each detected photon produces a bright output spot on a phosphor screen with a decay time of ~100 ns. The position of the light pulse is sensed using the novel arrangement of optics 202, 203, 204, coded masks 201, and photo detectors 206 shown in FIG. 2.

The unique architecture of the PAPA gives it several advantages over other photon-counting imagers. Because the amplification occurs in an image intensifier 205 that is optically coupled to the position sensor/PMTs 206, the complexity of the device grows slowly with increased resolution until the fundamental resolution limit of the image intensifier 205 is reached. For intensifiers using microchannel plates (MCP) (not shown), this limit is the $\geq 6$ $\mu$m pore diameter over an MCP that can range to 15 cm in diameter, or up to ~30,000 pixels along a diameter. Because the PAPA readout channels operate in parallel, the time to determine the event position is set by the decay time of the phosphor screen, independent of the number of pixels. For fast phosphors with decay times $\leq 100$ ns, the count rate can approach $10^7$ s$^{-1}$. Each channel makes a binary decision using a fast comparator in <20 ns.

Additional advantages of the PAPA detector, as compared to other photon counters, are derived from the separation of the amplification and position sensing functions. This would allow differing scintillators emitting light in different wavelength ranges to be used in a single radiation detector. The separation allows a single system to serve as a detector for several wavebands by interchanging front-ends with different photocathodes. Because the PAPA detector determines the position of a light pulse rather than of the electron cloud generated by the MCP, it can have a significantly higher count rate than other MCP-based photon-counting imagers. In an image intensifier 205, the electron cloud at the output of the MCP is further accelerated into a phosphor screen. With fast optics 202 and sensitive PMTs 206, a PAPA detector can operate the intensifier MCP below the voltage where saturation occurs. Other MCP-BASED imagers directly sense the position of the MCP electron output. Thus, they must operate the MCP in saturation to generate a sufficient signal. This gives the PAPA detector an advantage of at least 1–2 orders of magnitude in the local count rate.

The PAPA detector in one embodiment uses parallel optical processing; consequently the electronics for the PAPA detector are very simple and can be made compact and low power. The fast phosphors available have ~100 ns decay times enabling MHZ count rates. The decay time of most gamma-ray scintillators is longer, limiting the temporal response of the detector.

For instance, a PAPA detector with 21 optical channels yields 10 bit by 10 bit resolution (1024×1024 pixels) with one strobe channel and 20 channels with Gray coded masks, 10 for x and 10 for y position. This can be increased to a greater number of optical channels decreased and in no way is limited to 21 channels. The limitation as to the number of bits resolved and consequently the number of channels used is the resolution of the intensifier. Each of the 20 channels contributes one bit of position information. More sophisticated schemes can be used to increase the resolution by discriminating additional levels of the finest channels. In order for this scheme to work well, the images in each optical channel must be carefully aligned relative to the Gray-coded masks.

In one embodiment the radiation position is measured in the following manner: the output of the image intensifier 205 (FIG. 2) is collimated by a collimator 204 and an array of small lenses 203 forms multiple images of the intensifier output. A set of Gray-coded masks 201 lie in the image plane of the lens array 203. A set of lenses, field lenses 202, image the output from the masks onto a photo multiplier tube (PMT) 206. The PMTs 206 behind each mask 201 detects the intensifier output which is transmitted through the mask 201. Each channel's detector output is further amplified and discriminated. When a strobe channel (with no mask) signals that an event has been detected, the other channels are interrogated to see if their output is above or below a dynamic threshold. Each channel thus contributes one bit to the digital address of the detected photon.

The discriminator levels must be scaled by the strobe pulse height because the intensifier pulse height can vary considerably from event to event. The threshold is set to half of the strobe pulse height because the image of the intensifier output has finite width at the masks. This sets the pixel boundaries to the centroid of the intensifier spots. The variable thresholding also allows the intensifier to be operated below saturation. This has the advantages of increasing MCP lifetime and increasing the local count rate of the detector.

In one embodiment, the masks 201 are simple opaque and clear stripes which can be made with extreme accuracy using photo lithographic techniques. The stripes are aligned in a Gray (instead of binary) code which has the property that only one code bit changes from pixel to pixel. This reduces the position errors which can result from optical misalignment, imperfect electronics, or photon statistics at the photo detectors to an error in only the least significant bit. Conversion between Gray and binary code is performed trivially in a lookup ROM or with a few exclusive-or (XOR) gates.

Data Acquisition

In one embodiment this system comprises an interface box (not shown) which powers the PAPA detector or other photon counting and position sensitive detector 110, receives differential signals with up to 23 digital lines (22 data, 1 strobe), performs Gray-to-Binary conversion, and has handshaking signals to pass the data to a 32-bit interface card (not shown) connected to a computer.

PAPA Detector Modifications for Radiation Camera

Several aspects of the application of PAPA detectors 110 to determining position of scintillation events due to high energy radiation differ from their application to direct detection of lower energy photons. As outlined above, each detected radiated particle gives rise to a pulse of scintillated light which is imaged onto the photon counting and position sensitive detector 110. This light pulse gives rise to multiple photo detections at the front end intensifier cathode (not shown) spread out over several hundred nanoseconds.

This light pulse is actually much easier to detect than a single photo detection at the intensifier cathode. For single photo detection events, the gain of the intensifier must be greater than for the hybrid detector which typically has multiple photo detection events. In addition, the cathode on a conventional PAPA detector 110 must be cooled to reduce dark current to tolerable levels. For this application, dark current events on the photocathode can be easily rejected since there will be no associated detection by the PMTs looking at light from the sides of the scintillator.

The scintillation event is somewhat spread out in space and time Thus, it is necessary to tune the design of the PAPA detector optics and electronics to match the spatial and temporal extent of the light pulse. The temporal spreading is accomplished by speeding up or slowing down the electronics. The spatial extent of the scintillation event imaged onto the PAPA detector may limit the resolution of the position determination. It may require that a modified set of masks are employed in conjunction with additional centroiding of the scintillation pulse or that telecentric optics are used to image the scintillator onto the PAPA detector. This spatial extent depends on the details of the scintillating plate, its stopping power, and the optics of the hybrid detector.

What is claimed is:

1. An ionizing radiation detector for determining position of radiation and at least one characteristic of radiation besides position, the ionizing radiation detector comprising:
   a scintillator, wherein in response to the radiation the scintillator emits a first at least one photon in a first path and a second at least one photon in a second path;
   a photon counting and position sensitive detector in the first path in optical communication with the scintillator responsive to the first at least one photon for providing position information of the radiation, the photon counting and position sensitive detector capable of counting a single photon and determining the position of radiation corresponding to a single photon; and
   a photodetector in the second path responsive to the second at least one photon for determining at least one characteristic of the radiation other than position of the radiation.

2. The ionizing radiation detector of claim 1 wherein the at least one characteristic of the radiation is the energy level of the radiation.

3. The ionizing radiation detector of claim 1 wherein the at least one characteristic of the radiation is the type of radiation.

4. An ionizing radiation detector for determining the position and at least one other characteristic of radiation, the ionizing radiation detector comprising:
   a scintillator for emitting photons in response to radiation;
   at least one photo multiplier receiving the emitted photons from the scintillator;
   a photon counting and position sensitive detector in optical communication with the scintillator for detecting the position of the radiation; and
   an optical lens for coupling the emitted photons received from the scintillator to the photon counting and position sensitive detector.

5. The ionizing radiation detector of claim 4, wherein the scintillator has an internally facing mirrored front radiation entrance and at least one side, the internally facing mirrored front radiation entrance directs some of the emitted photons out the side of the scintillator.

6. The ionizing radiation detector of claim 4, wherein the scintillator is rectangular in shape and has an internally facing mirrored radiation entrance, two mirrored side windows, two clear side windows and a clear exit window through which emitted photons may exit the scintillator.

7. The ionizing radiation detector of claim 6, wherein the at least one photo multiplier is positioned adjacent to at least one of the two clear side windows.

8. An ionizing radiation detector comprising:
   an imaging plate which has at least one aperture through which radiation may pass;
   a scintillator in optical alignment with the imaging plate, the scintillator receiving radiation and producing emitted photons;
   a photon counting and position sensitive detector in optical communication with the scintillator for detecting the position of the radiation, the photon counting and position sensitive detector capable of counting a single photon and determining the position of radiation corresponding to a single photon; and
   at least one photo multiplier in optical alignment with the scintillator, the at least one photo multiplier receiving some of the emitted photons for determining at least one characteristic of the radiation besides position.

9. The ionizing radiation detector of claim 8 wherein the at least one characteristic of the radiation is the energy level of the radiation.

10. The ionizing radiation detector of claim 8 wherein the at least one characteristic of the radiation is the type of radiation.

11. An ionizing radiation detector for determining position of radiation and the energy level of radiation, the ionizing radiation detector comprising:
    a scintillator for emitting photons in response to gamma radiation;
    at least one photodetector responsive to the radiation for determining the energy level of the gamma radiation; and
    a photon counting and position sensitive detector in optical communication with the scintillator for providing the position of the gamma radiation, the photon counting and position sensitive detector capable of counting a single photon and determining the position of radiation corresponding to a single photon.

12. An ionizing radiation detector for determining position of radiation and the type of radiation, the ionizing radiation detector comprising:
    a scintillator for emitting photons in response to neutron radiation;
    at least one photodetector responsive to the neutron radiation for distinguishing the type of radiation; and
    a photon counting and position sensitive detector in optical communication with the scintillator for providing the position of the neutron radiation, the photon counting and position sensitive detector capable of counting a single photon and determining the position of radiation corresponding to a single photon.

13. The ionizing radiation detector of claim 8 wherein the scintillator further comprises a fast-phosphor output screen.

14. The ionizing radiation detector of claim 1 wherein the photon counting and position sensitive detector is a precision analog photon address detector.

15. An ionizing radiation detector for determining the position and at least one characteristic of radiation besides position, the ionizing radiation detector comprising:
- a scintillator for emitting photons in response to radiation;
- at least one photo multiplier for receiving the emitted photons from the scintillator;
- a precision analog photon address detector in optical communication with the scintillator for detecting the position of the radiation, the precision analog photon address detector capable of counting each photon and determining the position of radiation corresponding to each photon; and
- an optical lens for coupling the emitted photons received from the scintillator to the photon counting and position sensitive detector.

16. The ionizing radiation detector of claim 15, wherein the scintillator has an internally facing mirrored radiation entrance and at least one side, the mirrored radiation entrance directs some of the emitted photons out the side of the scintillator.

17. The ionizing radiation detector of claim 15, wherein the scintillator is rectangular in shape and has an internally facing mirrored radiation entrance, two mirrored side windows, two clear side windows and a clear exit window through which emitted photons may exit the scintillator.

18. The ionizing radiation detector of claim 17, wherein the at least one photo multiplier is positioned adjacent to at least one of the two clear side windows.

19. An ionizing radiation detector comprising:
- an imaging plate which has at least one aperture through which radiation may pass;
- a scintillator in optical alignment with the imaging plate for receiving radiation and producing emitted photons;
- a precision analog photon address detector in optical communication with the scintillator for detecting the position of the radiation, the precision analog photon address detector capable of counting each photon and determining the position of radiation corresponding to each photon; and
- at least one photo multiplier in optical alignment with the scintillator receiving some of the emitted photons for determining at least one characteristic of the radiation besides position.

20. The ionizing radiation detector of claim 19 wherein the at least one characteristic of the radiation is the energy level of the radiation.

21. The ionizing radiation detector of claim 19 wherein the at least one characteristic of the radiation is the type of radiation.

22. An ionizing radiation detector for determining position of radiation and energy level of radiation, the ionizing radiation detector comprising:
- a scintillator for emitting photons in response to gamma radiation;
- at least one photodetector responsive to the gamma radiation for determining the gamma radiation's energy level; and
- a precision analog photon address detector in optical communication with the scintillator for providing the position of the gamma radiation, the precision analog photon address detector capable of counting each photon and determining the position of radiation corresponding to each photon.

23. An ionizing radiation detector for determining position of radiation and type of radiation, the ionizing radiation detector comprising:
- a scintillator for emitting photons in response to neutron radiation;
- at least one photodetector responsive to the radiation for determining the type of radiation; and
- a precision analog photon address detector in optical communication with the scintillator for providing the position of the radiation, the precision analog photon address detector capable of counting each photon and determining the position of radiation corresponding to each photon.

24. The ionizing radiation detector of claim 19 wherein the scintillator further comprises a fast-phosphor output screen.

* * * * *